Dec. 11, 1945.  E. J. THOMPSON  2,390,854
ANIMAL TOILET
Filed Nov. 2, 1944

INVENTOR
EVELYN J. THOMPSON
BY
ATTORNEY

UNITED STATES PATENT OFFICE 2,390,854

ANIMAL TOILET

Evelyn J. Thompson, New York, N. Y.

Application November 2, 1944, Serial No. 561,524

5 Claims. (Cl. 119—15)

This invention relates to devices which house pets may use for toilet purposes, and it is particularly intended to provide such a device adapted for use by cats.

An advantage of devices made in accordance with this invention resides in the fact that they are complete in themselves and require no extraneous water or sewer connections for flushing purposes, and that they are nevertheless sanitary and odorless.

As is known, cats are essentially clean animals and it is their nature to conceal their excretions. It is a purpose of this invention to provide a toilet device which will attract a cat by its appeal to this nature. Other objects are cheapness and simplicity of construction, the minimizing of required attention, and facility in cleaning. Other objects and advantages of the invention will appear from the particular description.

Essentially the device consists of a shallow, open pan-like structure of suitable shape, which may be ornamented for appearance sake and which is properly proportioned in size. A partition divides this into two compartments, one for holding water and the other provided in its bottom with a hole of the proper size to serve as a toilet hole for the cat. Water is caused to leak out gradually from the water compartment and to be led to the edge of the hole in the other compartment, from where it drips into a removable receptacle underneath. This dripping water attracts the cat to use that hole for its toilet. The bottom preferably will slope toward the hole. A little sawdust or the like sprinkled on the bottom and into the water in the receptacle creates the illusion of dirt and further tempts the cat to use the hole.

I shall now describe an embodiment of the invention illustrated in the accompanying drawing, and shall thereafter point out the invention in claims.

Figure 1:
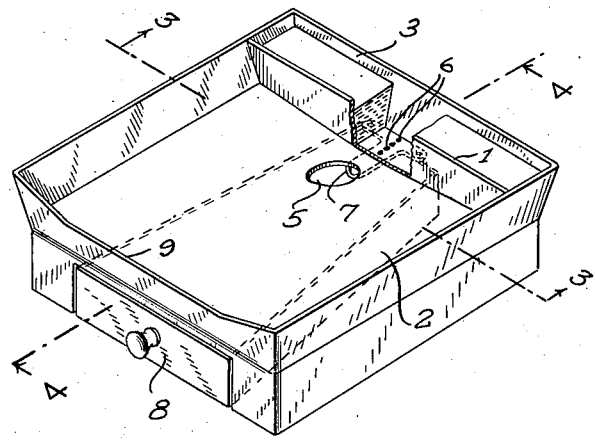
Fig. 1 is an isometric view, with certain parts broken away, of a device embodying the invention.
Figure 2:
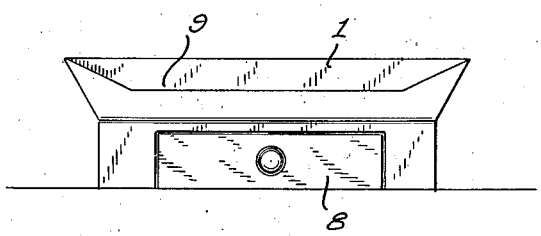
Fig. 2 is a front elevation of the same.
Figure 3:
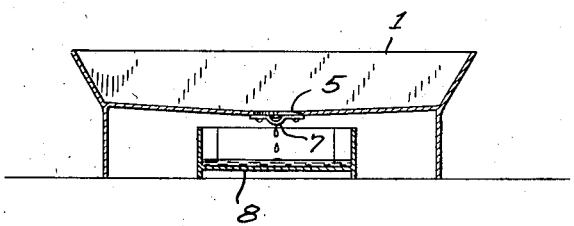
Fig. 3 is a sectional elevation on the line 3—3 of Fig. 1.

The device is shown as rectangular but it may be otherwise shaped. The material may be plastic, sheet metal, enamel ware and the like.

In general the device comprises a shallow pan the walls of which may flare, as shown, and a transverse partition 1 divides the container into the compartments 2 and 3, the former much larger than the latter and the compartments, therefore, being designated major and minor compartments, respectively. The front wall 4 may be reduced in height, as shown, as an inducement to a cat to enter from that side.

In the bottom of the compartment 2 is a hole 5 near the partition 1, and, as shown, the bottom may slope toward this hole. The bottom of the compartment 3 is provided with one or more small orifices 6 adjacent the hole 5, and a conductor, such as a gutter member 7, is secured underneath the orifices 6 and terminates at the near edge of the hole 5. The gutter member slopes toward the hole 5. The compartment 3 serves as a water tank and water therein slowly leaks through the orifices 6 and runs down the gutter member and drips from its end at the edge of the hole where it is visible.

The pan may stand on legs or the base may be continuous, as shown. In either case it is elevated to accommodate a receptacle 8 under it, disposed below the hole 5. Some water will ordinarily be placed in this receptacle when the device is prepared, and the tank 3 will at the same time be filled with water. As stated above, it is desirable to have some sawdust or like material floating on the water in the receptacle 8, and also to have some on the bottom of the pan.

Figure 4:
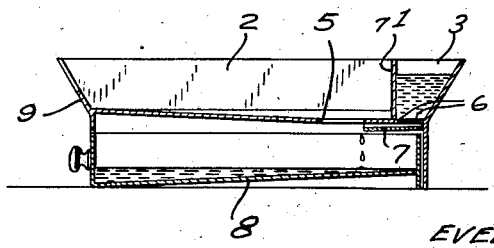
Fig. 4 is a sectional elevation on the line 4—4 of Fig. 1.

Preferably the bottom of the receptacle will be inclined, for example as shown in Fig. 4, with the result that the dripping water will run down toward the low side, at least until the water rises to a certain height in the receptacle, a fact which will further attract the cat.

The front wall 9 of the pan will preferably be reduced in height, as shown, so that a cat will ordinarily enter from that side. If desired the compartment 3 will have a cover.

It is obvious that the principles of the invention as pointed out in the following claims may be embodied in form differing in shape and detailed construction from that shown in the drawing and above particularly described.

I claim:

1. A toilet device for animals, such as cats, comprising a shallow pan structure having a transverse partition dividing the pan structure into major and minor compartments, the bottom of the major compartment having a toilet hole adjacent the partition and the bottom of the minor compartment having a leak orifice, means for leading water leaking through the orifice to the edge of the toilet hole, and a receptacle underneath the hole.

2. A toilet device for animals, such as cats, comprising a shallow pan structure having a transverse partition dividing the pan structure into major and minor compartments, the bottom of the major compartment having a toilet hole adjacent the partition and the bottom of the minor compartment having a leak orifice, a gutter member secured underneath the leak orifice and leading to the edge of the toilet hole, and a removable receptacle underneath the pan and disposed below the toilet hole.

3. A toilet device for animals, such as cats, comprising a shallow pan structure having a transverse partition dividing the pan structure into major and minor compartments, the bottom of the major compartment having a toilet hole adjacent the partition and the bottom of the minor compartment having a leak orifice, the bottom of the major compartment sloping toward the toilet hole, a gutter member secured underneath the leak orifice and leading to the edge of the toilet hole, and a removable receptacle underneath the pan and disposed below the toilet hole.

4. A toilet device for animals, such as cats, comprising a shallow pan structure having a hole in the bottom, a conductor for water leading to the edge of the hole underneath the bottom and adapted to discharge water at said edge, a source of water adapted continuously and slowly to deliver water into said conductor, and a receptacle underneath the hole.

5. A toilet device for animals, such as cats, comprising a shallow pan structure having a hole in the bottom with the bottom sloping toward said hole, a conductor for water leading to the edge of the hole underneath the bottom and adapted to discharge water at said edge, a source of water adapted continuously and slowly to deliver water into said conductor, and a receptacle underneath the hole.

EVELYN J. THOMPSON.